United States Patent
Bastide et al.

(10) Patent No.: US 10,203,987 B2
(45) Date of Patent: Feb. 12, 2019

(54) TECHNOLOGY FOR INCREASING DATA PROCESSING BY USERS

(71) Applicant: International Business Machines Corporation, Armonk, NY (US)

(72) Inventors: Paul R. Bastide, Boxford, MA (US); Jonathan Dunne, Dungarvan (IE); Liam Harpur, Skerries (IE); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 15/396,663

(22) Filed: Jan. 1, 2017

(65) Prior Publication Data

US 2018/0189106 A1    Jul. 5, 2018

(51) Int. Cl.
    *G06F 9/46*    (2006.01)
    *G06F 9/50*    (2006.01)

(52) U.S. Cl.
    CPC ................. *G06F 9/5027* (2013.01)

(58) Field of Classification Search
    CPC .................................................. G06F 9/52
    USPC ........................................................ 718/104
    See application file for complete search history.

(56) References Cited

U.S. PATENT DOCUMENTS

| | | | | |
|---|---|---|---|---|
| 2003/0140108 A1* | 7/2003 | Sampathkumar | ....... | H04L 29/06 709/208 |
| 2004/0243679 A1* | 12/2004 | Tyler | ................... | G06Q 10/107 709/206 |
| 2006/0146997 A1* | 7/2006 | Qian | ................. | H04M 3/42059 379/88.16 |
| 2006/0262776 A1* | 11/2006 | Pollock | ............ | H04L 29/06027 370/352 |
| 2007/0043866 A1* | 2/2007 | Garbow | ............... | G06Q 10/107 709/226 |
| 2008/0065736 A1* | 3/2008 | Gross | ................... | G06Q 10/107 709/207 |
| 2008/0298240 A1* | 12/2008 | Lee | ....................... | H04L 41/147 370/235 |
| 2009/0030992 A1* | 1/2009 | Callanan | ............. | G06Q 10/107 709/206 |

(Continued)

OTHER PUBLICATIONS

SANEBOX for Business web page, https://www.sanebox.com/business, downloaded Aug. 2, 2016.

*Primary Examiner* — Mehran Kamran
(74) *Attorney, Agent, or Firm* — Anthony V. S. England; L. Jeffrey Kelly

(57) ABSTRACT

An event is detected for a first user of a computer system in a computer network, where the event indicates the first user intends for predetermined users in the computer network to perform user-processing of predetermined data via computer systems of the predetermined users. An historical, use-metric value is determined for historical user-processing of data by the predetermined users. Availability of the predetermined users is determined. Responsive to the value and the availability, a threshold value of user-processing is determined for the predetermined users processing predetermined data. A current, use-metric value is detected for current user-processing. An action is performed by a computer system to increase user-processing of the predetermined data responsive to whether the current use-metric value exceeds the threshold value.

15 Claims, 3 Drawing Sheets

(56) References Cited

U.S. PATENT DOCUMENTS

| | | | |
|---|---|---|---|
| 2009/0037532 A1* | 2/2009 | Estrada | G06F 11/3419 |
| | | | 709/205 |
| 2010/0017484 A1* | 1/2010 | Accapadi | G06Q 10/107 |
| | | | 709/206 |
| 2010/0169264 A1 | 7/2010 | O'sullivan | |
| 2010/0211592 A1* | 8/2010 | Brownlee | H04L 51/00 |
| | | | 707/769 |
| 2010/0250682 A1* | 9/2010 | Goldberg | G06Q 10/107 |
| | | | 709/206 |
| 2011/0087744 A1* | 4/2011 | Deluca | G06Q 10/107 |
| | | | 709/206 |
| 2012/0030293 A1* | 2/2012 | Bobotek | G06Q 10/10 |
| | | | 709/206 |
| 2012/0331101 A1* | 12/2012 | Itaya | H04L 12/5885 |
| | | | 709/217 |
| 2014/0095627 A1* | 4/2014 | Romagnino | H04L 67/24 |
| | | | 709/206 |
| 2015/0213372 A1* | 7/2015 | Shah | H04L 12/58 |
| | | | 706/12 |
| 2015/0381552 A1* | 12/2015 | Vijay | H04L 51/32 |
| | | | 709/206 |
| 2016/0065494 A1* | 3/2016 | Aiello | G06F 11/1464 |
| | | | 709/226 |
| 2016/0132781 A1* | 5/2016 | Traupman | G06N 5/048 |
| | | | 706/52 |

* cited by examiner

TECHNOLOGY FOR INCREASING DATA PROCESSING BY USERS

FIELD OF THE INVENTION

The field of the present invention concerns data processing by users in a computer network.

BACKGROUND

Computer systems are used in a computer network by knowledge workers and others to process "data." The term "data" is used broadly to include both data and computer program instructions. "Data" may be generated by users of the computer network or by other persons or even by relatively autonomous computer systems, and may include, but is not limited to, raw data, documents, reports, programs, wikis, etc. for use within the computer network or externally. (In general, the terms "include," "including," or any other variation thereof, as used herein, are intended to cover a non-exclusive inclusion, such that a process, method, article, or apparatus that "includes" a list of elements may have other elements not expressly listed or inherent to such process, method, article, or apparatus.) "User-processing" of data includes users performing any or all of creating, editing, debugging, correcting, filtering, formatting and reviewing data via computer system, which may be done independently or collaboratively.

SUMMARY

In a method for user-processing of data in a computer network, an event is detected for a first user of a computer system in the computer network, where the event indicates the first user intends for predetermined users in the computer network to perform user-processing of predetermined data via computer systems of the predetermined users. A computer system determines, based on historical records of user-processing of data, an historical, use-metric value for historical user-processing of data by the predetermined users. A computer system determines availability of the predetermined users, and a computer system determines, responsive to the value and the availability, a threshold value of user-processing for the predetermined users processing predetermined data. A computer system detects current user-processing of the predetermined data by the predetermined users, and a computer system determines a current, use-metric value for the current processing. A computer system performs an action to increase user-processing of the predetermined data responsive to whether the current use-metric value exceeds the threshold value.

System and computer program products relating to the above-summarized method are also described and claimed herein.

BRIEF DESCRIPTION OF DRAWINGS

Novel features believed characteristic of the invention are set forth in the appended claims. The invention itself, however, as well as a preferred mode of use, objectives and advantages thereof, will best be understood by reference to the following detailed description of an illustrative embodiment when read in conjunction with the accompanying drawings, wherein:

DETAILED DESCRIPTION

Network-based applications enable users (also referred to herein as "requestors") to rapidly obtain processing of data by other users (also referred to herein as "recipients").

Detailed embodiments of the present invention are disclosed herein to illustrate claimed structures and methods. This invention may, however, be embodied in many different forms and should not be construed as limited to the exemplary embodiments disclosed herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Figure 1:
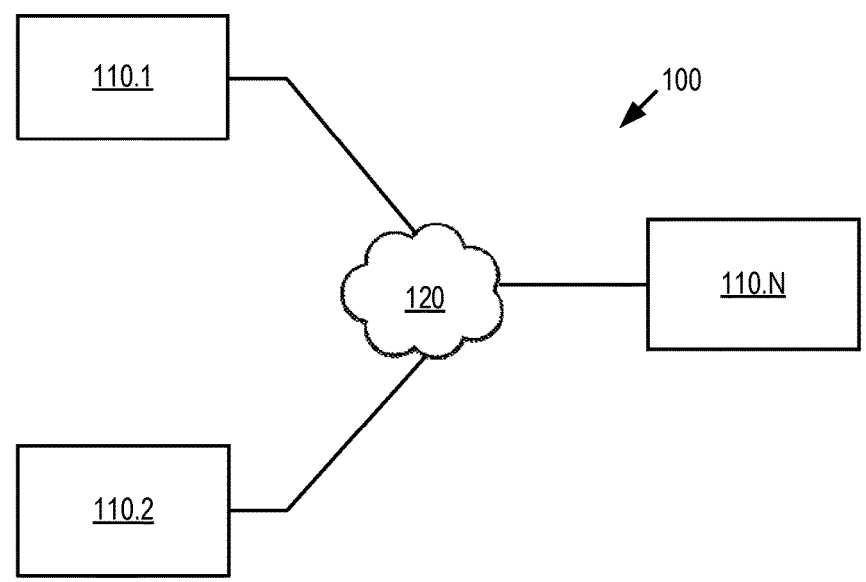
FIG. 1 illustrates a networked computer environment, according to embodiments of the present invention.

FIG. 1 illustrates an example computing and network communication environment 100, according to embodiments of the present invention. As shown, environment 100 includes computer systems 110.1, 110.2 through 110.N and connects via network 120, which may be public or private. Systems 110.1, 110.2, etc. include modules, which may be program or hardware modules, configured to perform tasks for their own respective systems or for other systems or both. In various instances, message communication via network 120 may include communication via protocols for email, instant message, text message or proprietary protocols.

Figure 2:
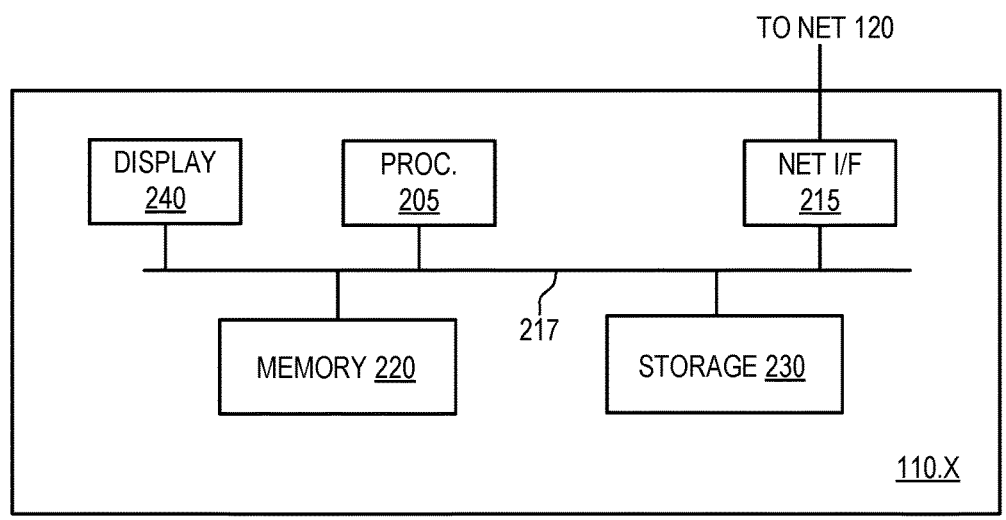
FIG. 2 is a block diagram of a computer system suitable for systems shown in FIG. 1, according to embodiments of the present invention.

FIG. 2 illustrates details of a computer system 200 suitable as computer systems 110.1, 110.2, etc. according to embodiments of the present invention, wherein system 200 includes at least one central processing unit (CPU) 205, network interface 215, interconnect (i.e., bus) 217, memory 220, storage device 230 and display 240 where system 200 may include an icon management module 260. CPU 205 may retrieve and execute programming instructions stored in memory 220 for applications, including module 260. Similarly, CPU 205 may retrieve and store application data residing in memory 220. Interconnect 217 may facilitate transmission, such as of programming instructions and application data, among CPU 205, storage 230, network interface 215, and memory 220. CPU 205 is representative of a single CPU, multiple CPUs, a single CPU having multiple processing cores, and the like. Additionally, memory 220 is representative of a random-access memory, which includes data and program modules for run-time execution, such as model builder 103, according to embodiments of the present invention. It should be understood that system 200 may be implemented by other hardware and that one or more modules thereof may be firmware.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products.

(IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged based on the class data in the key field. In this embodiment, the data corresponding to the key field in each of the merged data tables is preferably the same. However, data tables having similar, though not identical, data in the key fields may also be merged by using AGREP, for example.

The host may provide a suitable website or other internet-based graphical user interface accessible by users. In one embodiment, Netscape web server, IBM® Websphere® Internet tools suite, an IBM DB2, universal database platform and a Sybase database platform are used in conjunction with a Sun Solaris operating system platform. (IBM and WebSphere are trademarks of International Business Machines Corporation, registered in many jurisdictions worldwide.) Additionally, components such as JBDC drivers, IBM connection pooling and IBM MQ series connection methods may be used to provide data access to several sources. The term webpage as it is used herein is not meant to limit the type of documents and applications that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper applications, plug-ins, and the like.

Figure 3:
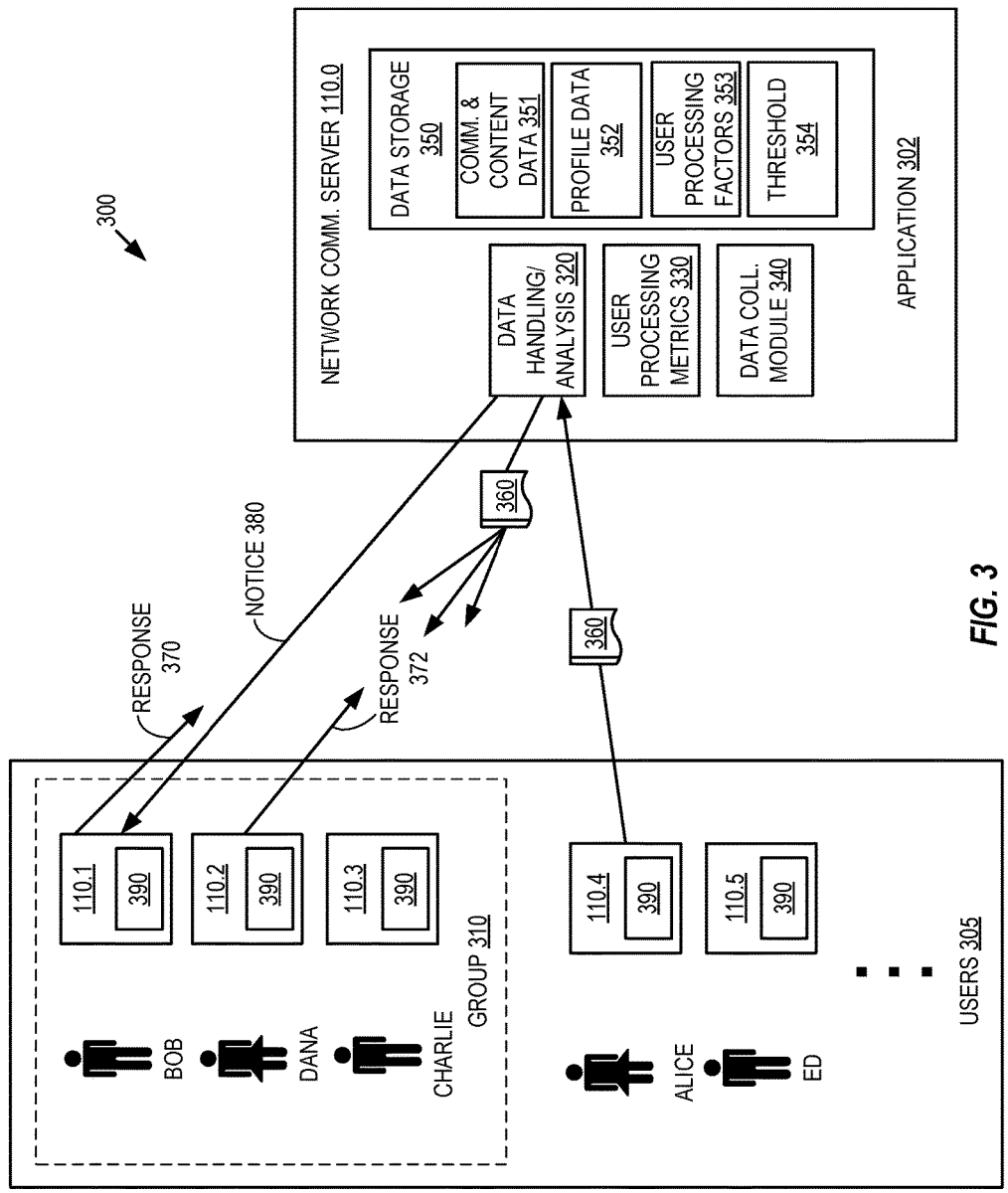
FIG. 3 illustrates additional aspects of the computing environment of FIGS. 1 and 2, according to embodiments of the present invention.

Referring to FIG. 3, additional aspects are illustrated for a system 300, according to embodiments of the present invention, which includes aspects of computing environment 100 of FIG. 1. As shown, server 110.0 includes data processing application 302, which may be, or may include, a group networking application, such as Kalvyn Workgroup Software, Apple Workgroup Manager, Workgroups DaVinci, IBM Connections, and Horde Groupware. Application 302 includes data handling and analysis module 320 (also referred to herein as "content module" or "DHA" module) configured for performing functions including receiving, and storing data from a requestor and distributing the data to recipients for user processing, where the user processing may be for generating more data, improving quality of data, and for many other reasons. Embodiments of the present invention include a recognition that users from whom a requestor needs data processing may miss or undesirably delay handling, requiring the requestor to check for action of recipients and remind recipients who have not completed processing or who have not notified the requestor of their completion.

The following is not the only way that DHA module 320 may interact with data (also referred to herein as "content") and users, but in one aspect, for example, DHA module 320 in the illustrated instance may receive data 360 composed via computing device 110.4 by Alice, who is a requestor and author 305. In response, DHA module 320 may store data 360 in local storage, such as storage 350 of server 110.0, or in remote storage, and may distribute the content to recipient users 305 (users engaged in data processing may also be referred to herein as "authors"). For example, in the illustrated instance, users 305 are Dana, Bob, Charlie and Ed, as specified by Alice.

DHA module 320 is further configured to analyze data 360 for determining types of content, for determining content subjects, and for categorizing content subjects into topic categories. The content is analyzed using natural language processing, such as comparing and determining N-Grams to topic mappings, or by entity recognition using a tool like Watson Entity Recognition, available from International Business Machines Corporation.

Application 302 on server 110.0 also includes data collection module 340, which is configured to collect communications data relating to user processing of data (also referred to herein as "content engagement") via communications network 120, where module 340 may store the communications data in communications and content data repository 351. User processing actions for which module 340 may monitor include any one or more of reviewing, reading, commenting upon, liking or otherwise recommending the data, or replying directly to the requestor, for example.

Application 302 also includes user processing metrics module 330 (also referred to herein as "engagement module" or "UPM module"). The collected communications data collected by module 340 provides a historical record, which UPM module 330 uses to predict how quickly a response is likely from a user who has been requested to engage particular content in the past. The collected communications data also provides information about a current request, which UPM module 330 compares to a likely response time derived from the historic communication data. Based on this comparison, UPM module 330 may take actions to expedite content engagement, as described herein below.

Data collection module 340, more specifically, is configured to monitor for, or otherwise receive notice of, content engagement actions of recipients of data 360, e.g., users to whom a requestor directs content for their engagement or who otherwise receive content for their engagement. This may include module 340 monitoring content engagement requests to all users within a defined local network, in an embodiment of the present invention, or may include monitoring a specific predefined set of users regardless of their locations or networks, in another embodiment, or may include a combination of both kinds of monitoring.

Still more specifically, data collection module 340 is configured, in an embodiment of the present invention, to detect whenever a first user requests a second user to engage with content, where the first user or the second user or both is/are on a particular, predefined network, or is/are among one or more predefined set(s) of users. Further, data collection module 340 is configured to detect whenever the recipients engage with the content (reading, replying, etc.). Upon detecting a content engagement request or engagement, data collection module 340 records details, including identification of the content, the requester and recipients, the date and time of communications, and other communication details. Data collected by data collection module 340 may include elapsed times between requests and responses and, as described herein below, which module 340 records in repository 351. Data collection module 340 is further configured to collect user availability data, either continually or in response to events, where collected data includes calendar and task management system data for requestors and recipients which module 340 records in profile data repository 352. Based on the collected data, module 330 may compile statistics about historical response times and may relate historical response time statistics to availability data.

It should be appreciated that functions may be allocated among modules differently than described herein. For example, the description herein may indicate that a first module performs a first function and a second module performs a second function; whereas in another embodiment of the present invention, the first module may perform the second function and the second module may perform the first function.

Figure 4:
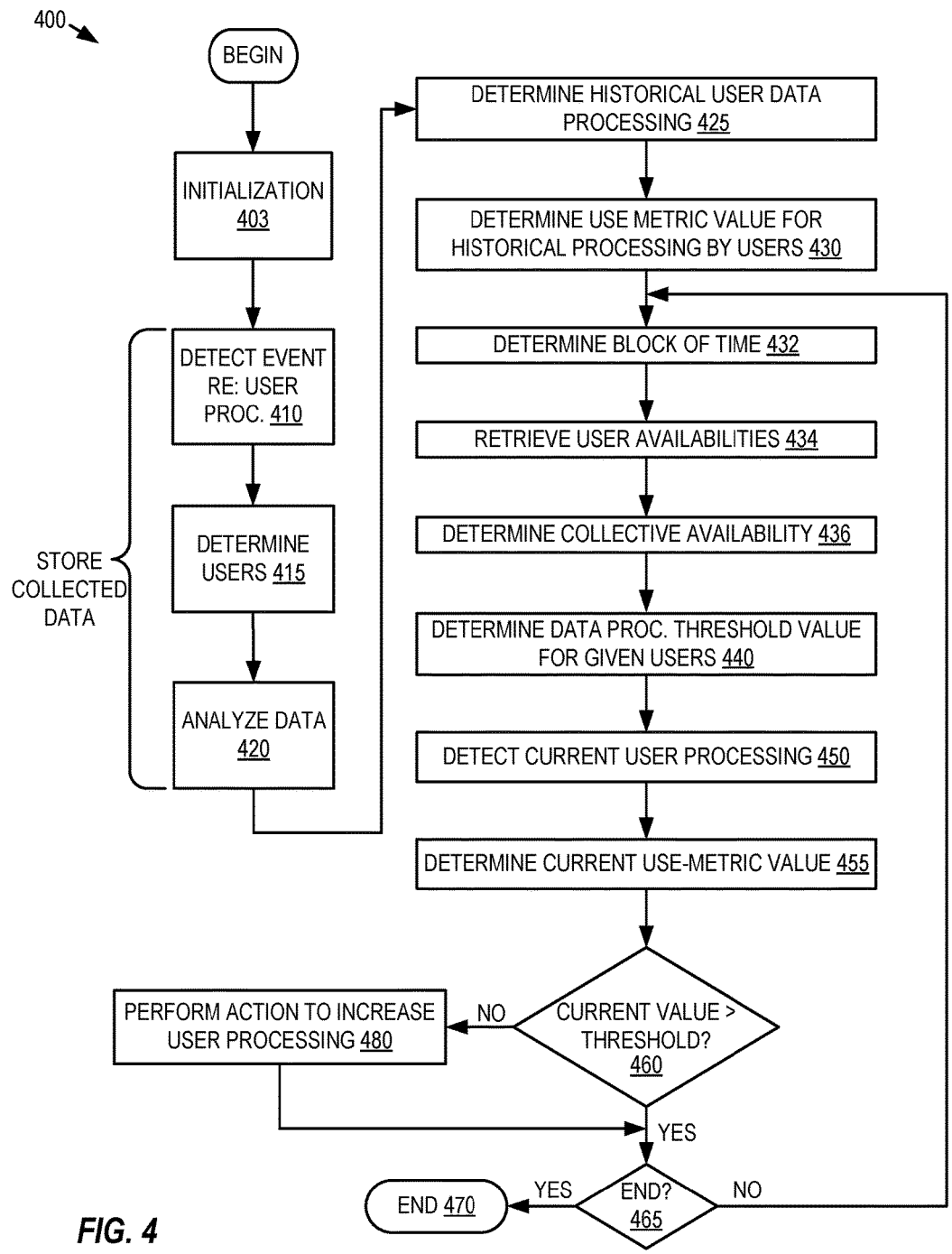
FIG. 4 illustrates computer system based actions in the computing environment of FIGS. 1 through 3, according to embodiments of the present invention.

Referring now to FIGS. 3 and 4, a flow chart 400 is shown in FIG. 4 illustrating actions performed for automating content engagement in a communication network, according to an embodiment of the present invention, including actions by data processing application 302 in server 110.0. Data collection module 340 detects 410, according to its configuration, an event for a first user of a computer system in the computer network, where the event indicates the first user intends for predetermined users in the computer network to perform user-processing of predetermined data via computer systems of the predetermined users. The event may be, for example, a requester pushing content to recipients for their action, e.g., sending an email, posting to a blog page, social network page, or the like, posting to a work sharing site, etc. For example, requestor Alice composes product manual 360 at computing device 110.4 and posts it to an on-premises file sharing system (e.g., IBM Connections) for review by her defined document group 310, Bob, Dana, and Charlie, wherein data collection module 340 responsively detects 410 the posting as an intent to share content, detects 415 recipients of the review request, passes identification of requestor and recipient to DHA module 320, and notifies DHA module 320 to obtain and analyze 420 the content (product manual 360 for product XYZ, in the illustrated instance). In this example, module 340 detects 415 the recipients specified by Alice, as shown in FIG. 3.

Further, responsive to receiving the notification from data collection module 340, DHA module 320 performs content analysis 420 of product manual 360 to determine content data, including type of content, content subject matter, and one or more topic categories, for example, which DHA module 320 stores for use in determining current and future use in processing. For example, the content type, subject matter and topic categories may be used for matching the data, i.e., the product manual, to other data that the users have processed in the past, so that analysis of past processing may be limited to analysis of processing identical data, or at least similar data. By analyzing the product manual, DHA module 320 determines the content type is "product manual," content subject matter is "product XYZ," and topic categories indicate functions and applications of the product, for example. Data collection module 340 stores data collected at 410, 415, and 420 for use in analysis of current and historical user processing 425, as shown.

Responsive to determining content data and receiving identity of recipients from data collection module 340, DHA module 320 determines 425, according to its configuration, response characteristics for past transactions about matching content among the current requestor and recipients, which DHA module 320 finds by searching in data 351 of data storage 350 for matching content, requestor, and recipients, according to an embodiment of the present invention. In the forgoing example, module 320 determines response characteristics of Bob, Dana, and Charlie for past engagement requests from Alice about a product manual and about a product XYZ, where the response characteristics include the elapsed times it took from receipt for each recipient to previously provide their respective responses to requests having these particular characteristics, where a response may be providing a result of reviewing, editing, composing, etc.

For example, module 320 finds in data 351 a historic record of a past communication about an email Bob received on May 5, 2016, at 8:00 AM requesting that he edit Product Manual XYZ. The historic record indicates that Bob replied to the requestor at 2:00 PM with his edited product. In this case, module 320 determines the elapsed time was 5 hours, i.e., from 9:00 AM to 2:00 PM.

Application 320 next proceeds to 430, where UPM module 330 receives the elapsed time data from DHA module 320 that module 320 computed based on the historic records it found for the detected recipients and detected content (e.g., content that corresponds to one or more of type, subject, and topic). In response, UPM module 330 computes a recipient engagement value using historical elapsed time data received from DHA module 320 as follows:

Average engagement value for group of recipients (request basis)=sum of recipient elapsed time/total number of requests In other words, module 330 determines 430, based on historical records of user-processing of data, which module 330 received from module 320, an historical, use-metric value for historical user-processing of data by predetermined users. Determining the historical, use-metric value includes, in this instance at least, calculating an average elapsed time for a plurality of instances of user-processing by the predetermined users. In at least one embodiment of the present invention, in the determining of the historical, use-metric value for the historical user-processing of data by the predetermined users, the historical user-processing is limited to user-processing of data matching the predetermined data.

For example, in four past requests regarding content like Product Manual XYZ, i.e., data that matches Product Manual XYZ in some respect, such as the name of the content, its topic(s), or the like, Bob's elapsed times were 1 hour, 0.6 hours, 1.6 hours, and 0.8 hours. There was only one such request for Dana and none for Charlie. Dana's elapsed time was 8 hours for the one request. UPM module 330 thus computes an average recipient engagement value for the group on a request basis of (1+0.6+1.6+0.8+8 hours)/5 requests=2.4 hours.

Data processing application 302 is further configured to determine 440 a threshold value of user-processing for the predetermined users processing predetermined data, such as the engagement threshold value described in this example, which module 330 does responsive to the use-metric value, such as average engagement value=2.4 hours in the above example, and responsive to availability of the predetermined users. To do this, UPM module 330 determines 432 a calendar window (i.e., block of time) based on the previously determined recipient engagement value. For example, since Alice initiated 410 intent to share content at 9:00 AM in the above described instance, module 330 first determines that for a block of time starting at 9:00 AM, i.e., the time when Alice initiated 410 her sharing action, the block should end at 11:30 AM in order to correspond to the 2.4-hour previously determined recipient engagement value, where module 330 rounds up the block of time from 2.4 hours to 2.5 hours based on a minimum 15-minute scheduling block used by Alice's company. (In other embodiments, there may be no rounding or there may be rounding down, instead of rounding up. Further, the rounding may be in larger or smaller increments.) For the 9:00-11:00 AM block of time, DHA module 320 then looks up current availability data for the recipients of the current transaction, where the lookup is in profile data repository 352. (As previously mentioned, the availability data in repository 352 was obtained from calendar and task management system data.) In the present example, for recipient Dana, UPM module 330 retrieves 434 availabilities of recipients for the 9:00-11:30 AM window from profile data 352 collected by data collection module 340. In the illustrated instance, Dana is available from 9:00-10:00 AM and unavailable from 10:00-11:30 AM. Therefore, Dana is available for 1 hour during the block of time. Bob is available from 10:00-11:30 AM and unavailable from 9:00-10:00 AM. Bob is therefore available for 1.5 hours of the block of time. Charlie is unavailable during the 9:00 to 11:30 AM block of time. Once it looks up the availability data, DHA module 320 passes it to UPM module 330.

Responsive to the received recipient availability data and the determined block of time, UPM module 330 determines total 436, i.e., collective, availability of the recipients over the 9:00-11:30 AM block of time. Thus, during the 9:00 to 11:30 AM block of time in the present example, module 330 determines the total available recipient time is 1+1.5=2.5 hours. Because Charlie is completely unavailable during the block of time in this example, Charlie is not included in the recipient engagement threshold value example calculations below, which is in accordance with one embodiment of the present invention.

Next, UPM module 330 uses the total recipient availability time to calculate 440 a user processing threshold value, e.g., a recipient engagement threshold value for the recipient group as follows:

Engagement threshold value for group of recipients=sum of available time for all recipients/block of time Using the above example, for the 2.5-hour block of time, module 330 sums the available time of all recipients, which is coincidentally also 2.5 hours in this example, i.e., 1 hour for Dana and 1.5 hours for Bob during the 2.5-hour block of time from 9:00-11:30 AM. Then UPM module 330 divides the sum of available times of all the recipients by the block of time to compute a recipient engagement threshold value, which is 2.5/2.5=1 in this instance. This indicates the combined total of availability for all recipients during the block of time is the equivalent of one person.

From the above it should be understood that lower user-processing threshold values indicate lower likelihood of obtaining sufficient recipient response to a request for processing, while higher user-processing threshold values indicate higher likelihood of obtaining sufficient recipient response. Further, it should be understood that the calculated threshold value is much more than merely a measure of availability of recipients to perform requested content engagement. More particularly, it is a measure based on a current time frame, where the time frame is established on the basis of historical responsiveness of the recipients and where recipient current availability is examined for that particular current time frame. The threshold value provides not just a conventional measure of current, collective availability of recipients, but rather an adjusted measure of current recipient availability that is normalized on the basis of the historical responsiveness of the recipients during the particularly determined time frame and for the particular requestor and content. Nevertheless, while user-processing threshold value is not merely a measure of availability of recipients, it does partly depend on availability of recipients.

As previously mentioned, data collection module 340 monitors communications for data processing requests and responses. (As also previously mention, at least in part, actions that are considered engagement actions includes actions such as editing content, reading content, a reply directly to the sender, a retweet or other sharing of the content, a "like" or other recommendation of the content, or a comment upon the content, are considered engagement actions.) Responsive to detecting these actions, module 340 records the actions, time thereof, requestors, recipients, and content in data 351 for use as historic data for future transactions and for use in the present transaction. For the current transactions, UPM module 330 searches data 351 and finds 450 for the current block of time how many data processing actions the requested users 305 performed on the content or the current transaction. In other words, module 330 detects 450 current user-processing of the predetermined data by the predetermined users, which module 330 does by finding records of the processing, i.e., data collected by modules 320 and 340 as previously described. In the above example, UPM module 330 finds communications for the current transaction in the 9:00-11:30 AM block of time.

Then UPM module 330 determines 455 a current, use-metric value for the current processing. Using the above example, module 330 computes, as the current, use-metric value, the total number of recipient engagement actions it found for the current transaction in the 9:00-11:30 AM block of time. Module 330 then compares i) the current, use-metric value for the current transaction, e.g., the total number of recipient engagement actions, and ii) the threshold value of user-processing for the current transaction, e.g., recipient engagement value threshold, in order to determine 460 whether the number of recipient engagements exceed the predetermined recipient engagement threshold value.

If the current engagement actions of the recipients at least equal the predetermined recipient engagement threshold value, UPM module 330 does not take action to expedite content engagement and branches to end 465 for the current block of time for the current transaction. However, if the total of recipient engagement actions is less than the predetermined recipient engagement threshold value, UPM module 330 signals DHA module 320 to perform 480 an action to increase user processing of the data, which may be referred to herein as a "quorum achievement" action. At 465, if the current block of time for the current transaction has ended, UPM module 330 branches to end 470 for the current transaction. However, if the current block of time for the current transaction has not ended, UPM module 330 signals DHA module 320 to branch to 432 for further processing.

Actions to increase user processing include notices that are presented in a manner that drives recipient engagement. For example, a notice space 390 is provided for each recipient's view of application 302, wherein DHA module 320 of application 302 presents engagement-level-based notices in space 390, such as notice 380 about data 360 to Bob described herein above, in space 390. In one such embodiment, notices are presented in chronological order according to when given content was originally shared, e.g., by the date and time Alice shared data 360 in the illustrated instance. In one or more embodiments, notices such as 380 are presented in a manner that even further drives recipient attention. For example, DHA module 320 of application 302 presents notices in order of each recipient's historical average elapsed time to engage particular content wherein higher elapsed tie notices are presented first. Presentations such as described above may include rearranging the order of notices when notices for new content are generated. Other quorum achievement actions may include pinning or moving shared content to the top of a list presented in notice space 390, sending a notice to the recipients that have not engaged with shared content, and promoting a survey to capture feedback.

For example, if Bob "likes" Product Manual XYZ at 10:00 AM, this counts as one engagement action. If Dana edits Product Manual XYZ from 9:00-10:00 AM and saves her edits, this counts as another engagement action. In the illustrated example, these communications are responses 370 and 372 about data 360 (Product Manual XYZ) by recipients Bob and Dana. Each recipient response counts toward the number of engagement actions. Upon expiration of the block of time, i.e., at 11:30 AM, UPM module 330 retrieves the recipient engagement threshold value, i.e., 1, and compares it to the number of recipient engagements, i.e., 2, for shared content to determine at 460 whether the recipient engagements exceed the predetermined recipient engagement threshold value. In this case, the current engagement actions of the recipients exceed the predetermined recipient engagement threshold value which was determined based on availability during the designated block of time, where the designated block of time was determined based on historic responses to Alice for similar content engagement requests. Consequently, UPM module 330 branches to end 470 for Product Manual XYZ. If, however, no one responded to the engagement request for Product Manual XYZ during the 9:00-11:30 AM window, recipient engagement actions would be less than the predetermined recipient engagement threshold value of 1, and module 330 would signal DHA module 320 to perform a quorum achievement action at 480, such as promoting Alice's request to Bob, Charlie, and Dana.

In another embodiment, upon expiration of the block of time at 11:30 AM, UPM module 330 may restart analysis of recipient engagement at 450 for a new block of time. In an embodiment, module 330 may only start a new block of time if the recipient engagement actions in the first block did not at least equal the predetermined recipient engagement threshold value. For example, UPM module 330 may start a new 2.5-hour block of time at 11:30 AM and determine recipient availability for that block of time. From the new availability data, module 330 computes a new recipient engagement value and recipient engagement threshold value. Once again, if the recipient engagement actions during the new block of time do not at least equal the predetermined recipient engagement threshold value at 2:00 PM, i.e., the end of the new block of time, UPM module 330 signals DHA module 320 to perform a quorum achievement action at 480. In an embodiment, if a quorum achievement action was previously performed at the end of the first block of time, the second quorum achievement action performs a higher-level action. For example, DHA module 320 may generate a secondary interaction with Bob, Charlie, and Dana, or whichever one of them has not responded yet, such as notification by a different channel. For example, other instances of notification space 390 may be included in other applications that Bob, Charlie and Dana use on their computer systems, and module 320 may send an additional notification to the other spaces 390. This may include sending a text message notification to a mobile phone. DHA module 320 may also notify Alice to contact whichever one of Bob, Charlie and Dana has not responded yet, which Alice may do in various ways, including calling or texting and by face-to-face meeting(s).

Data processing application 302 may also preemptively alert recipients who have a history of exceeding desired or expected response times. In this case, the previously described average recipient engagement value, which is a collective average time to respond for all recipients for particular content topic, is compared to each individual recipient's average time to respond to the particular content topic. That is, UPM module 330 receives elapsed time data from DHA module 320 that module 320 computed based on the historic records it found for each recipient and detected content (e.g., content that corresponds to one or more of type, subject, and topic). In response, UPM module 330 computes each recipient's engagement value using historical elapsed time data received from DHA module 320 as follows:

Recipient engagement value for individual (request basis)=sum of individual recipient's elapsed time/total number of requests For example, in four past requests regarding content like Product Manual XYZ, Bob's elapsed times were 1 hour, 0.6 hours, 1.6 hours, and 0.8 hours. There was only one such request for Dana and none for Charlie. Dana's elapsed time was 8 hours for the one request. UPM module 330 thus computes Bob's recipient engagement value on a request basis as (1+0.6+1.6+0.8)/4 requests=1 hour. UPM module 330 computes Dana's individual recipient engagement value on a request basis as 8/1=8 hours. Since Charlie has no historic records for the detected content, Product Manual XYZ, Charlie will not be considered in the present embodiment. Then UPM module 330 compares Bob and Dana's recipient engagement values to the average recipient engagement value of 2.4 hours for Product Manual XYZ, as calculated above for the group. Since Bob's 1 hour recipient engagement value is less than the average recipient engagement value of 2.4 hours for the group (i.e., Bob has historically responded faster than average), UPM module 330 does not take action to preemptively alert Bob of Alice's request to review Product Manual XYZ. On the other hand, since Dana's 8-hour recipient engagement value is greater than the average recipient engagement value of 2.4 hours (i.e., Alice has historically responded slower than average), UPM module 330 may preemptively alert Dana to Alice's request to review Product Manual XYZ. For example, module 330 may signal DHA module 320 to perform send a high priority email to Dana in addition to Alice's notification of intent to share content at 9:00 AM or shortly thereafter.

Some ways to detect 410 intent to share content have been described herein above. These and additional ways include detecting responsive to push, pull, and user interface events. In push events, application 302 transmits content to recipients for their action (Gnip and Compliance APIs), as described above. In pull events, application 302 is configured to monitor a set of files/content for updates thereto via a communications network, for example, wherein intent to share 410 may be detected responsive to changes in the files/content.

In user interface events, application 302 is configured to communicate with a user interface ("UI") that a user 305 uses for interacting with content. For example, when user Dana edits Product Manual XYZ using a document processing application having file sharing features, this may trigger application 302 to detect 410 intent by Dana to share content with, and request engagement by, Alice, Bob and Charlie, because application 302 is configured to interface with the document processing/file sharing application and because when Dana undertook a project to edit or create Product Manual XYZ, or when Dana edited or created Product Manual XYZ, Dana configured the document processing/file sharing application to share Product Manual XYZ with Alice, Bob and Charlie. For example, when Dana is editing or creating Product Manual XYZ, the document processing/file sharing application may present user Dana with a menu button within or otherwise associated with Product Manual XYZ, allowing her to initiate group review of the product manual. Responsive to Dana clicking the menu button, application 302 triggers intent to share Product Manual XYZ with Alice, Bob, and Charlie. In other words, user interface events may be automatically inline to the content, for example, and activated via a menu or a user interface element presented to the user from within the content or within the application for processing the content.

Application 302 may apply qualitative values for content engagement based on predetermined user processing factors 353 and engagement type threshold values 354 configured by a user in data storage 350. In such an embodiment, a requesting user 305 interacts with an initialization process 403, wherein the user 305 communicates initial engagement type factors and threshold value settings to UPM module 330 for recording in data storage 350. For example, at initialization 403 Alice defines a user processing factor 353 of "1" for "liking" content, an engagement type factor 352 of "3" for replying to, sharing or commenting upon content, an engagement type factor 352 of "4" for editing content, and an engagement type threshold value 354 of "4." During a previously determined block of time, Bob engaged 370 with Alice's Product Manual XYZ by "liking" it, and Dana engaged 372 with Product Manual XYZ by editing it. In response, UPM module 330 computes a qualitative recipient engagement value as 1+4=5 (i.e., a "1" for the "like" response 370 and "4" for the editing response 372). Since the score of 5 exceeds Alice's engagement type threshold value 354 of "4, no quorum achievement action is taken. If the qualitative recipient engagement value had been less than 4, module 330 would signal DHA module 320 to perform a quorum achievement action at 480.

Application 302 may further apply a qualitative value to levels of recipient engagement with content based on predetermined user processing factors 353 and content engagement threshold values 354 configured by a user in data storage 350. In such an embodiment, a requesting user 305 interacts with an initialization process 403, wherein the user 305 communicates initial content engagement factors and threshold values settings to UPM module 330 for recording in data storage 350. For example, at initialization 403 Alice defines qualitative engagement factors, such as a user processing factor 353 of "1" for reading at least half, "2" for reading more than half of Product Manual XYZ, "3" for reading all, "4" for editing at least half, "5" for editing more than half, and "6" for editing all of Product Manual XYZ. Further, Alice's assigns a content engagement threshold value 354 as "6." During a previously determined block of time, Bob reads 370 all of Product Manual XYZ, and Dana edits 372 more than half of Product Manual XYZ. In response, UPM module 330 computes a qualitative content engagement value as 3+6=11 (i.e., a "3" for the reading all response 370 and "6" for editing more than half of response 370). Since the score of 11 exceeds Alice's author engagement value threshold 354 of 6, no quorum achievement action is taken. If the content engagement value had been less than 6, module 330 would signal DHA module 320 to perform a quorum achievement action at 480.

In a variation of what is described above regarding engagement values, UPM module 330 computes a recipient engagement value on a recipient basis instead of on a request basis, as follows:

Average recipient engagement value for a group (recipient basis)=sum of recipient elapsed time/number of recipients For example, for engagement requests by Alice about content like Product Manual XYZ, Bob has historically taken an average of 1 hour from receipt to response (elapsed time), while Dana has taken an average of 8 hours. There is no historical communication data in repository 351 for Charlie, so Charlie is not considered in this example. UPM module 330 thus computes an average recipient engagement value per recipient on a recipient basis=9 hours/2 recipients=4.5 hours, for this example. (In embodiments of the present invention, Charlie may be included in the number of recipients for the above calculation, even though he has no historical communication data, i.e., his elapsed time is zero.)

In a variation of what is described above regarding historic data, the data may include not only elapsed time, but also work time and wait time, where elapsed time is the sum of work time and wait time. Correspondingly, in certain embodiments module 320 may determine not just elapsed time, but also work time and wait time. For example, the historic record may indicate Bob opened the email at 9:00 AM and worked on Product Manual XYZ for 1 hour. Bob returned to Product Manual XYZ at 1:00 PM and edited it for another hour. Accordingly, module 320 may determine work time for Bob on Product Manual XYZ was 2 hours (9:00-10:00 AM plus 1:00-2:00 PM) and wait time was 3 hours (10:00 AM-1:00 PM).

The structures and processes disclosed herein may be used with collaboration systems, project management and social systems, including, for example, social networking, asynchronous networks (e.g., "I Follow" types of networks, like Twitter, etc.), synchronous networks (e.g., "I Connect" types of networks, like IBM Connections, etc.), email (e.g., IBM Notes/Domino, Microsoft Exchange, Google Mail, etc.), real time instant messaging (e.g., Persistent Chat, IBM SameTime, etc.), other instant messaging (e.g., IBM SameTime, etc.), wiki networks (e.g., IBM Connections Wiki, Confluence Wiki, etc.) and other product/task systems (e.g., Rational Team Concert, Microsoft Project, etc.). The structures and processes disclosed herein may be used with instant messaging (IM), short message services (SMS), blogs, web sites, communities (such as, for example, LinkedIn and Facebook), news feeds, emails, VoIP, software phones (such as, for example, Skype and Google Voice), etc.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Those skilled in the art having read this disclosure will recognize that changes and modifications may be made to the embodiments without departing from the scope of the present invention.

It should be appreciated that the particular implementations shown and described herein are illustrative of the invention and its best mode and are not intended to otherwise limit the scope of the present invention in any way. Other variations are within the scope of the following claims.

The actions recited in the claims can be performed in a different order and still achieve desirable results. Likewise, the processes depicted in the accompanying figures do not necessarily require the particular order shown, or sequential order, to achieve desirable results. In certain implementations, multitasking and parallel processing can be advantageous.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

As used herein, the terms "comprises," "comprising," or any other variation thereof, are intended to cover a non-exclusive inclusion, such that a process, method, article, or apparatus that "comprises" a list of elements may have other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for user-processing of data in a computer network, the method comprising:
   detecting an event for a first user of a computer system in the computer network, where the event indicates the first user intends for predetermined users in the computer network to perform user-processing of predetermined data via computer systems of the predetermined users, including a predetermined amount of collective processing by the predetermined users as a group;
   determining, by a computer system based on historical records of individual user-processing of data, an average amount of historical user-processing time for the group based on elapsed times for completions of historical user-processing of data by the predetermined users;
   determining, by a computer system, collective availability of the predetermined users, wherein determining the collective availability includes determining a current block of calendar time beginning at a time of a request for the predetermined users to process the predetermined data and lasting for the average amount of historical user-processing time for the group, and includes determining collective availability of the predetermined users for the current block of time based on appointment calendars of the predetermined users;
   determining, by a computer system responsive to the average amount for the group and the availability, a threshold value of collective user-processing for the predetermined users processing predetermined data;
   detecting, by a computer system, current user-processing of the predetermined data by the predetermined users;
   determining, by a computer system, a current collective amount of processing for the current processing; and
   performing an action by a computer system to increase collective user-processing of the predetermined data responsive to whether the current collective amount of user processing exceeds the threshold value.

2. The method of claim 1, where, in the determining of the historical amount of user-processing of data by the predetermined users, the historical user-processing consists of user-processing of data matching the predetermined data.

3. The method of claim 1, where determining the historical amount of user-processing of data by the predetermined users comprises:
   calculating an average elapsed time for a plurality of instances of user-processing by the predetermined users.

4. The method of claim 1, where determining the threshold value comprises:
   calculating a sum of times during which the predetermined users are available in the block of time; and
   expressing the threshold value as a proportion of the sum relative to a length of time defined by the block of time.

5. The method of claim 1, where the action is selected from the group consisting of promoting, pinning, moving, sending a notice, and sending a survey to at least one of the predetermined users.

6. A system for user-processing of data, the system comprising:
- a processor; and
- a computer readable storage medium connected to the processor, where the computer readable storage medium has recorded thereon a program for controlling the processor, and where the processor is operative with the program to execute the program for:
- detecting an event for a first user of a computer system in the computer network, where the event indicates the first user intends for predetermined users in the computer network to perform user-processing of predetermined data via computer systems of the predetermined users, including a predetermined amount of collective processing by the predetermined users as a group;
- determining, based on historical records of user-processing of data an average amount of historical user-processing time for the group based on elapsed times for completions of historical user-processing of data by the predetermined users;
- determining collective availability of the predetermined users, wherein determining the collective availability includes determining a current block of calendar time beginning at a time of a request for the predetermined users to process the predetermined data and lasting for the average amount of historical user-processing time for the group, and includes determining collective availability of the predetermined users for the current block of time based on appointment calendars of the predetermined users;
- determining, responsive to the average amount for the group and the availability, a threshold value of collective user-processing for the predetermined users processing predetermined data;
  - detecting current user-processing of the predetermined data by the predetermined users;
  - determining a current, collective amount of processing for the current processing; and
  - performing an action to increase collective user-processing of the predetermined data responsive to whether the current collective amount of user processing exceeds the threshold value.

7. The system of claim 6, where, in the determining of the historical amount of user-processing of data by the predetermined users, the historical user-processing consists of user-processing of data matching the predetermined data.

8. The system of claim 6, where determining the historical amount of user-processing of data by the predetermined users comprises:
- calculating an average elapsed time for a plurality of instances of user-processing by the predetermined users.

9. The system of claim 6, where determining the threshold value comprises:
- calculating a sum of times during which the predetermined users are available in the block of time; and
- expressing the threshold value as a proportion of the sum relative to a length of time defined by the block of time.

10. The system of claim 6, where the action is selected from the group consisting of promoting, pinning, moving, sending a notice, and sending a survey to at least one of the predetermined users.

11. A computer program product for user-processing of data in a computer network, including a computer readable storage medium having instructions stored thereon for execution by a computer system, where the instructions, when executed by the computer system, cause the computer system to implement a method comprising:
- detecting an event for a first user of a computer system in the computer network, where the event indicates the first user intends for predetermined users in the computer network to perform user-processing of predetermined data via computer systems of the predetermined users including a predetermined amount of collective processing by the predetermined users as a group;
- determining, based on historical records of user-processing of data an average amount of historical user-processing time for the group based on elapsed times for completions of historical user-processing of data by the predetermined users;
- determining collective availability of the predetermined users, wherein determining the collective availability includes determining a current block of calendar time beginning at a time of a request for the predetermined users to process the predetermined data and lasting for the average amount of historical user-processing time for the group, and includes determining collective availability of the predetermined users for the current block of time based on appointment calendars of the predetermined users;
- determining, responsive to the average amount for the group and the availability, a threshold value of collective user-processing for the predetermined users processing predetermined data;
  - detecting current user-processing of the predetermined data by the predetermined users;
  - determining a current, collective amount of processing for the current processing; and
- performing an action to increase collective user-processing of the predetermined data responsive to whether the current collective amount of processing exceeds the threshold value.

12. The computer program product of claim 11, where, in the determining of the historical amount of user-processing of data by the predetermined users, the historical user-processing consists of user-processing of data matching the predetermined data.

13. The computer program product of claim 11, where determining the historical amount of user-processing of data by the predetermined users comprises:
- calculating an average elapsed time for a plurality of instances of user-processing by the predetermined users.

14. The computer program product of claim 11, where determining the threshold value comprises:
- calculating a sum of times during which the predetermined users are available in the block of time; and
- expressing the threshold value as a proportion of the sum relative to a length of time defined by the block of time.

15. The computer program product of claim 11, where the action is selected from the group consisting of promoting, pinning, moving, sending a notice, and sending a survey to at least one of the predetermined users.

* * * * *